(12) United States Patent
Lyon et al.

(10) Patent No.: US 12,726,594 B2
(45) **Date of Patent: *Sep. 1, 2026**

(54) REMOTE COLLABORATIONS WITH VOLUMETRIC SPACE INDICATIONS

(71) Applicant: Microsoft Technology Licensing, LLC, Redmond, WA (US)

(72) Inventors: Todd Michael Lyon, Seattle, WA (US); Jacob A. Bomgardner, Duvall, WA (US); Scott David Petill, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

This patent is subject to a terminal disclaimer.

(21) Appl. No.: 18/614,340

(22) Filed: Mar. 22, 2024

(65) Prior Publication Data

US 2024/0259530 A1 Aug. 1, 2024

Related U.S. Application Data

(63) Continuation of application No. 17/445,110, filed on Aug. 16, 2021, now Pat. No. 11,968,475, which is a (Continued)

(51) Int. Cl.
*H04N 7/14* (2006.01)
*G02B 27/01* (2006.01)
(Continued)

(52) U.S. Cl.
CPC .......... *H04N 7/157* (2013.01); *G02B 27/017* (2013.01); *G06T 19/003* (2013.01)

(58) Field of Classification Search
CPC ..... H04N 7/157; G02B 27/017; G06T 19/003
(Continued)

(56) References Cited

U.S. PATENT DOCUMENTS 10,152,851 B2 * 12/2018 Gatta ..................... G06F 1/163
10,304,247 B2 * 5/2019 King ..................... G06F 3/012
(Continued)

OTHER PUBLICATIONS

Extended European Search Report Received for European Patent Application No. 26170332.6 mailed on Jul. 10, 2026, 06 pages.
(Continued)

*Primary Examiner* — Binh Kien Tieu
(74) *Attorney, Agent, or Firm* — Alleman Hall LLP

(57) ABSTRACT

Examples are disclosed that relate to computing devices, head-mounted display devices and methods for remote collaborations. In one example a computing device receives receive a spatial mapping of a first three-dimensional environment and determines that a volumetric space in the spatial mapping satisfies at least one collaboration criterion. The collaboration criterion comprises a first object in the first three-dimensional environment and a second object in a second three-dimensional environment sharing a common semantic label. Based on determining that the volumetric space satisfies the collaboration criterion, a shared hologram is displayed by a first display device at the first object in the first environment and by a second display device at the second object in the second three-dimensional environment.

20 Claims, 12 Drawing Sheets

Related U.S. Application Data continuation of application No. 16/745,085, filed on Jan. 16, 2020, now Pat. No. 11,095,855.

(51) Int. Cl.
*G06T 19/00* (2011.01)
*H04N 7/15* (2006.01)

(58) Field of Classification Search
USPC ........................................................ 348/14.08
See application file for complete search history.

(56) References Cited

U.S. PATENT DOCUMENTS

| | | | | |
|---|---|---|---|---|
| 10,798,292 | B1 * | 10/2020 | Lei | G06F 3/011 |
| 11,095,855 | B2 * | 8/2021 | Lyon | G06T 19/003 |
| 11,968,475 | B2 * | 4/2024 | Lyon | G06F 3/0304 |
| 2017/0237789 | A1 * | 8/2017 | Harner | H04L 65/4015 709/205 |
| 2019/0005728 | A1 * | 1/2019 | Leppanen | G06T 19/20 |
| 2022/0012951 | A1 * | 1/2022 | Guerra Filho | G06F 3/011 |

OTHER PUBLICATIONS

Decision to Grant pursuant to Article 97(1) received in European Application No. 20824040.8, mailed on Apr. 23, 2026, 2 pages.

* cited by examiner

REMOTE COLLABORATIONS WITH VOLUMETRIC SPACE INDICATIONS

CROSS REFERENCE TO RELATED APPLICATIONS

This application is a continuation of U.S. patent application Ser. No. 17/445,110 filed Aug. 16, 2021, which is a continuation of U.S. patent application Ser. No. 16/745,085, filed Jan. 16, 2020, now granted as U.S. Pat. No. 11,095,855, the entirety of each of which is hereby incorporated herein by reference for all purposes.

BACKGROUND

Some display systems are configured to display virtual imagery mixed with a real-world background, for example via a see-through display system or via augmentation of a video image of the real-world background. Some display systems display virtual imagery in a completely immersive virtual reality environment, with no view or display of the surrounding real-world. Where people in remote locations use such display systems to collaboratively share and interact with content, differences between their real-world spaces and/or displayed virtual objects can present challenges.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to devices and methods for remote collaborations. In one example, a computing device for facilitating remote collaborations receives a spatial mapping of a first three-dimensional environment. The computing device determines that a volumetric space in the spatial mapping of the first three-dimensional environment satisfies at least one collaboration criterion that facilitates collaborative interaction with virtual content, wherein the collaboration criterion comprises determining that a first object in the first three-dimensional environment and a second object in a second three-dimensional environment share a common semantic label. Based on determining that the volumetric space satisfies the at least one collaboration criterion, the computing device causes a shared hologram to be displayed by a first display device at the first object in the first environment, and causes the shared hologram to be displayed by a second display device at the second object in the second three-dimensional environment.

Other examples of a computing device for facilitating remote collaborations and a method for facilitating remote collaboration between a first display device and a second display device are also disclosed.

DETAILED DESCRIPTION

Figure 1A:
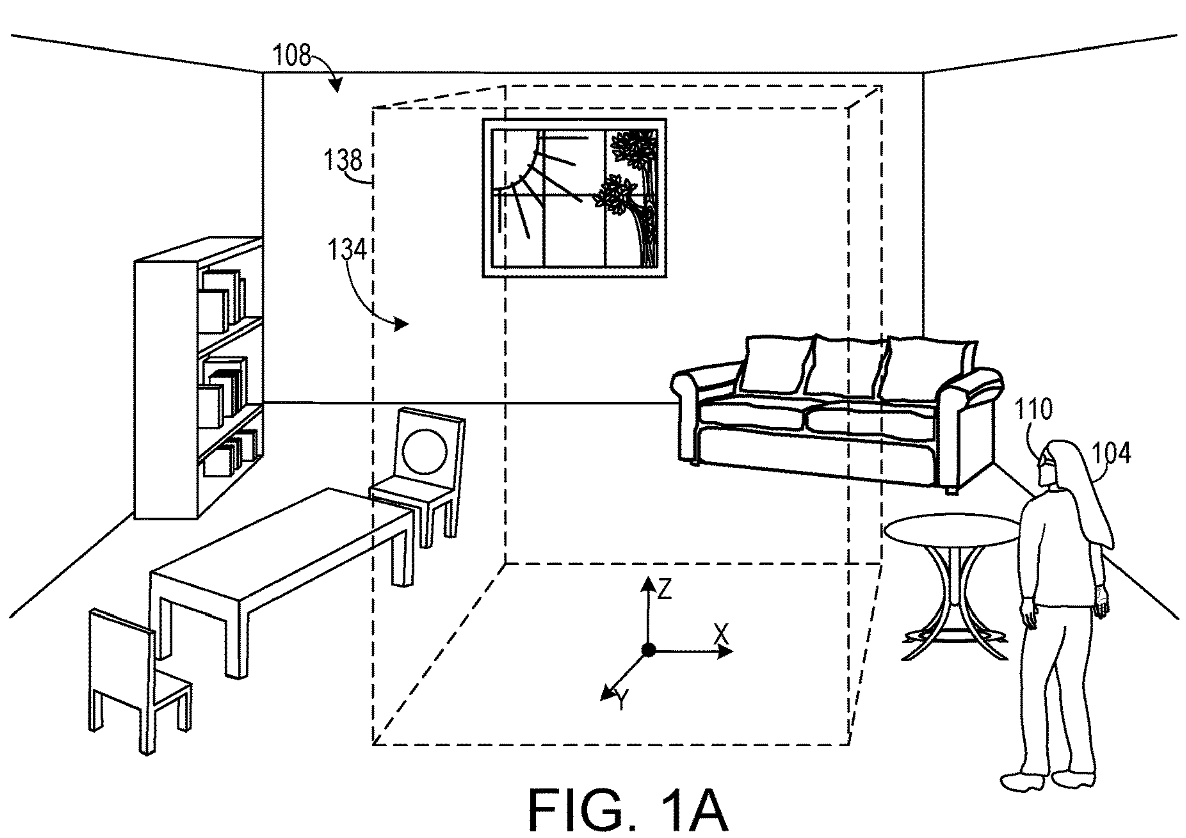
FIGS. 1A and 1B show an example of two use case environments in which remote users wear HMD devices that display indications of volumetric spaces according to examples of the present disclosure.

A mixed or virtual reality system, such as an HMD device, may permit a user to view and interact with a variety of displayed holographic objects. In some examples, two or more users in different locations may desire to view and interact with the same hologram(s) in their respective real-world locations. For example and with reference to the example use environments shown in FIGS. 1A and 1B, a user Brandi 104 is standing in her living room 108 and wears an HMD device in the form of a mixed reality display system 110. At the same time another user Tyler 114 stands in his apartment 118 also wearing a mixed reality HMD device 122.

As described in more detail below, the mixed reality HMD devices 110, 122 display virtual imagery to the user via a see-through display system such that at least a portion of the real-world background is viewable concurrently with the displayed virtual imagery. While initially described in the context of a mixed reality display system and the use of a see-through display, it will be understood that the present disclosure and examples described herein also may be enacted via a video-augmented mixed reality display system in which a video image of a physical environment is obtained by a camera and then augmented with virtual image data when displayed to a user of the system. The present disclosure and examples described herein also may be enacted via a virtual reality display system that displays a completely immersive virtual reality environment with no view or display of the surrounding real-world.

Returning to the example of FIGS. 1 and 2, because the physical, real-world objects in the living room 108 and the apartment 118 are different and arranged in different locations, collaborating with holograms shared in both spaces can create challenges. For example, if user Brandi shares a hologram that is displayed in user Tyler's apartment 118 on the floor near the wall-mounted display 126, Tyler's view of the hologram may be obscured by the table 130. Further, the table 130 may create a physical obstacle to Tyler approaching and/or interacting with the hologram and could present a collision hazard with the potential for injury. In other examples where Tyler's HMD device 122 also displays virtual objects, such existing displayed objects can create similar hindrances. In these and other examples where two or more users desire to share virtual imagery in a collaborative manner, determining safe, convenient and accessible spaces in which to display such imagery in disparate environments can prove challenging.

Accordingly, examples of computing devices and methods are disclosed for enabling more effective and convenient collaborations with shared virtual content between users in different locations. Briefly and as described in more detail below, in some examples a computing device receives a first spatial mapping of a first environment and a second spatial mapping of a second environment. The computing device determines that a first volumetric space in the first environment satisfies at least one collaboration criterion, and a second volumetric space in the second environment satisfies the collaboration criterion. Based on determining that the first volumetric space and the second volumetric space each satisfy the at least one collaboration criterion, the computing device causes an indication of the first volumetric space to be displayed by a first display device in the first environment, and an indication of the second volumetric space to be displayed by a second display device in the second environment.

With reference again to FIGS. 1A and 1B, in one example user Brandi's HMD device 110 may receive a first spatial mapping of her living room 108. For example, and as described in more detail below, one or more image sensors in HMD device 110 may collect image data (depth data and/or visible light data). Using such data the HMD device 110 may generate a three-dimensional spatial mapping comprising surface reconstructions and/or other depth maps of the real-world surfaces in living room 108. For example, a spatial mapping may comprise many spatial surfaces that describe real-world surfaces in a small volume of space, represented as a triangle mesh attached to a world-locked spatial coordinate system. In other examples, image data of living room 108 may be collected by one or more other image sensors, such as camera(s) mounted in fixed locations in the room. In these examples the image data is received by the HMD device 110 directly from such other image sensors and/or an intermediate computing device, such as an edge computing device, via a network.

Using the three-dimensional spatial mapping of the living room 108, the HMD device 110 determines a volumetric space within the living room that is suitable for collaborations with another remote user. In some examples, the HMD device 110 determines if a candidate volumetric space satisfies one or more collaboration criteria. In one example, a collaboration criterion comprises determining an absence of objects in a candidate volumetric space. In other words, the HMD device 110 determines whether a candidate volumetric space is free from any real-world and/or displayed virtual objects within the space. If it is determined that the volumetric space satisfies the collaboration criterion, the HMD device 110 displays an indication of the first volumetric space to the user.

Returning to FIG. 1A, in this example the HMD device 110 determines that the volumetric space 134 contained within the rectangular volume outlined in dotted lines satisfies the collaboration criterion of an absence of objects in a candidate volumetric space. Accordingly, the HMD device 110 displays an indication of the volumetric space 134, such as by displaying an outline 138 of the volumetric space to user Brandi. In other examples any other suitable indication of the volumetric space 134 may be displayed, such as by slightly shading or highlighting the volume, transparently displaying the four vertical walls of the volume, etc. Additionally, in other examples any suitable shape or geometry of volumetric space may be utilized, including other planar, curved and/or irregular surfaces.

In this manner, virtual content such as holograms shared from another user and displayed within the volumetric space 134 will not be obscured from view by any physical or virtual objects in the living room 108. Further, the user Brandi 104 may freely move about the volumetric space 134 during collaborations with another remote user(s) without worry of bumping into any physical objects. The outline 138 of the volumetric space 134 also may be displayed world-locked in a fixed location relative to the living room 108. In this manner, a consistent and fixed volume of space is provided for collaborations with remote users as described herein.

Figure 1B:
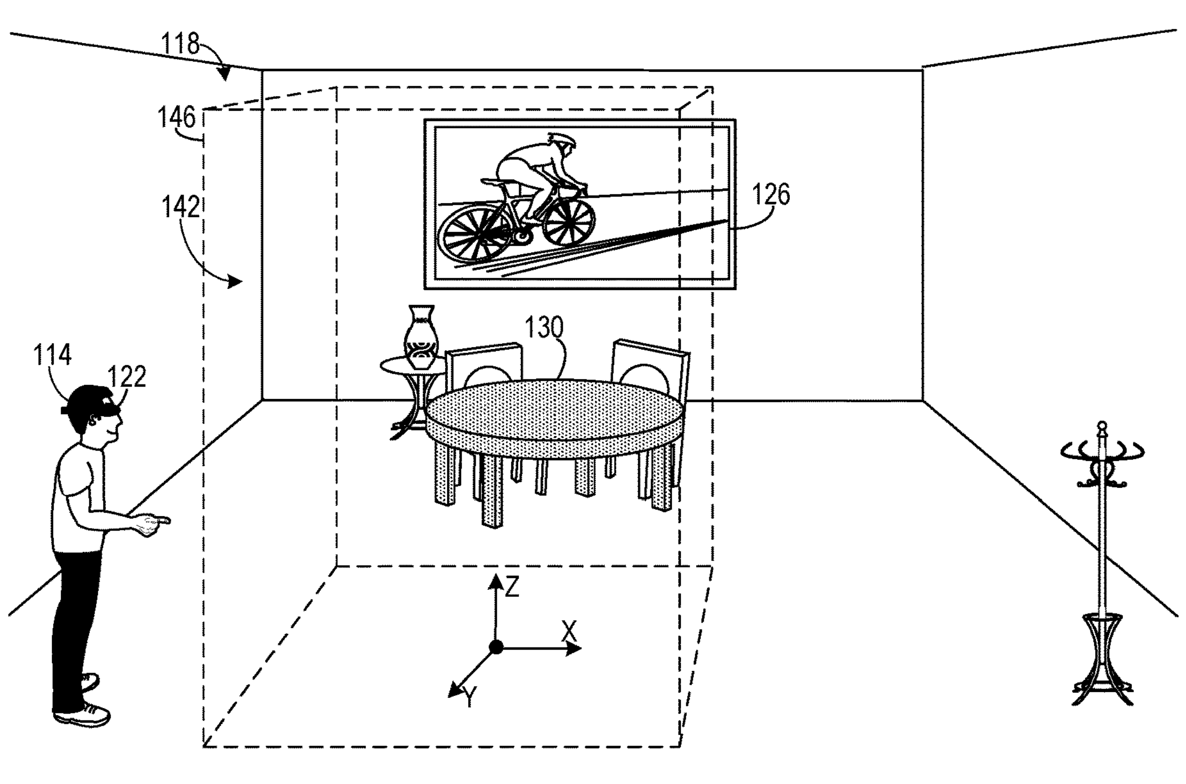

In a similar manner and with reference to FIG. 1B, Tyler's HMD device 122 determines that the volumetric space 142 contained within the rectangular volume outlined in dotted lines satisfies the collaboration criterion of an absence of objects within the space. Accordingly, his HMD device 122 displays an indication of the volumetric space 142 in the form of an outline 146 of the space to Tyler. Advantageously and in this manner, volumetric spaces free from obstructions may be easily and conveniently generated and displayed to remote users to facilitate their collaborative sharing and interaction with virtual content.

Figure 2A:
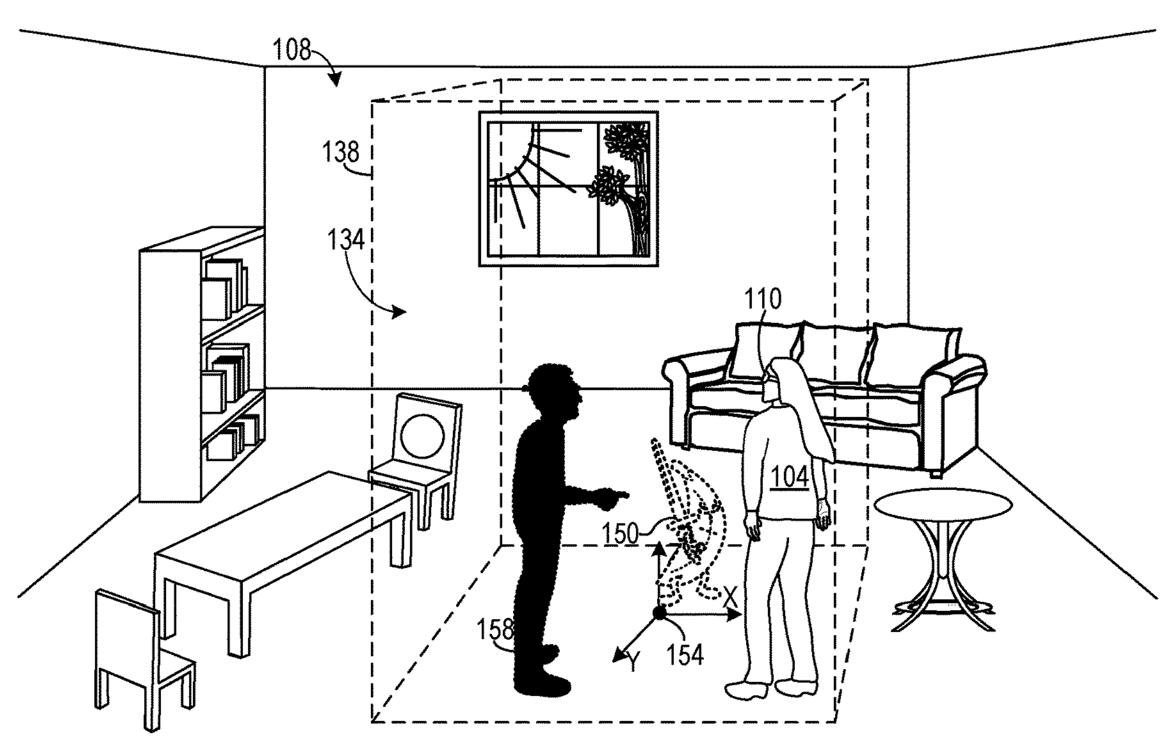
FIGS. 2A and 2B show the use case environments of FIG. 1 with user avatars and a hologram displayed according to examples of the present disclosure.
Figure 2B:
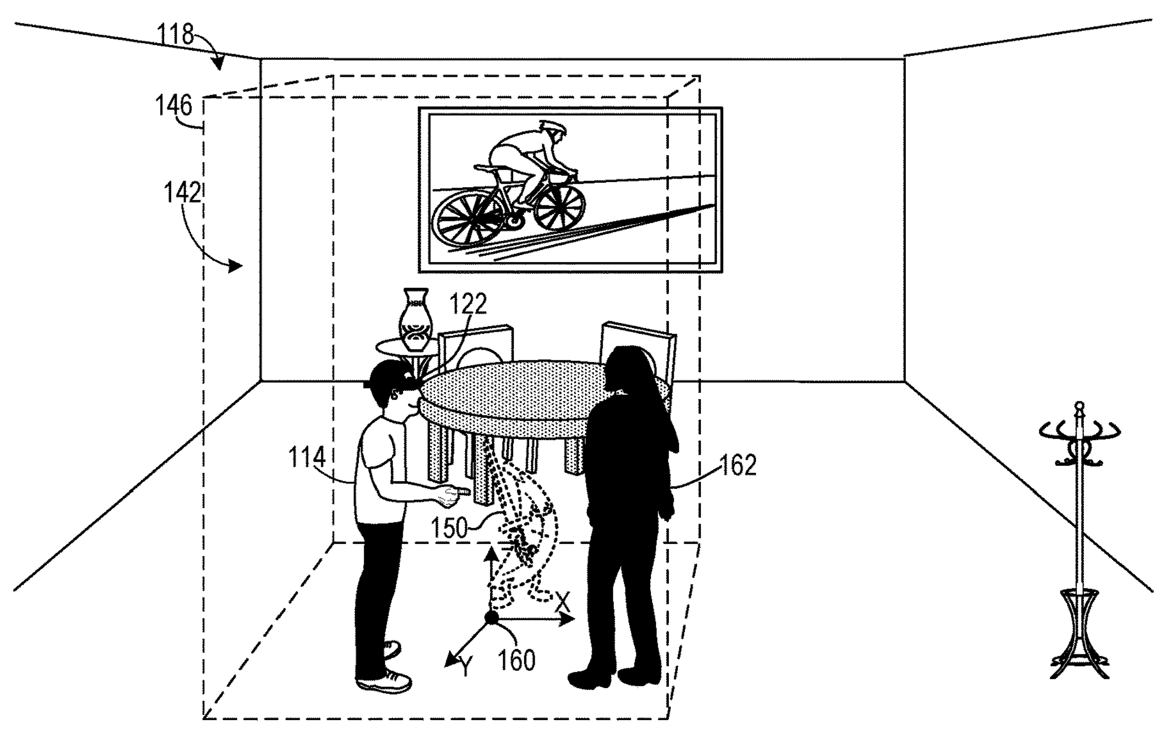

In one example and with reference to FIGS. 2A and 2B, Brandi's HMD device 110 may display an evil banana hologram 150 within the volumetric space 134. The HMD device 110 generates a spatial coordinate system, such as a Cartesian coordinate system, to reason about the positions and orientations of real-world objects and rendered virtual content in the living room 108. Such a coordinate system establishes 3 perpendicular X, Y and Z axes along which to locate and position objects. In FIG. 2A, the hologram 150 is displayed at a designated location relative to the origin 154 of the spatial coordinate system indicated by the X-Y-Z axes. While in this example the origin 154 is located inside the volumetric space 134, in other examples the origin may be located elsewhere in the room 108.

Turning to FIG. 2B, Tyler's HMD device 122 also generates a spatial coordinate system with an origin 160 to position and orient real-world objects and rendered virtual content in the apartment 118. In some examples, upon establishing a collaboration with Brandi's HMD device 110, the origin 154 associated with Brandi's HMD device 110 and the origin 160 associated with Tyler's HMD device 122 are utilized as common origins, whereby shared holograms are displayed by each HMD device at the same designated location relative to the respective origin.

In the example of FIGS. 2A and 2B, when Brandi's HMD device 110 displays the evil banana hologram 150 at this designated location relative to the origin 154 in her room, and Brandi shares the hologram with Tyler, Tyler's HMD device 122 automatically displays this hologram at the same designated location relative to the origin 160 in his apartment 118. Also in this example, in each volumetric space a virtual avatar of the remote person is displayed. In FIG. 2A, a virtual avatar 158 of Tyler is displayed at a location relative to origin 154 that is the same as Tyler's real-world location relative to the origin 160 in his apartment 118. Similarly, in FIG. 2B a virtual avatar 162 of Brandi is displayed at a location relative to origin 160 that is the same as Brandi's real-world location relative to the origin 154 in her living room 108. In this manner, both Brandi 104 and Tyler 114 can move about their respective real-world environments while accurately perceiving in real-time the corresponding movements of the other person's avatar relative to the shared hologram 150.

In the example of FIGS. 2A and 2B, both of the volumetric spaces 134 and 142 each have substantially the same volume. In this manner, both Brandi 104 and Tyler 114 may experience their collaborations within a common volume of space. In other examples, different volumetric spaces in different locations may have different volumes during a collaboration.

In the above-described examples, the techniques and processes for determining, generating and displaying the volumetric spaces and virtual content are performed locally by the HMD devices 110 and 122, which are communicatively coupled via a network. In some examples, one or more of these functions may be executed by one or more other computing devices, such as one or more standalone or edge computing devices, via cloud-based services, or using other suitable computing devices.

Figure 3:
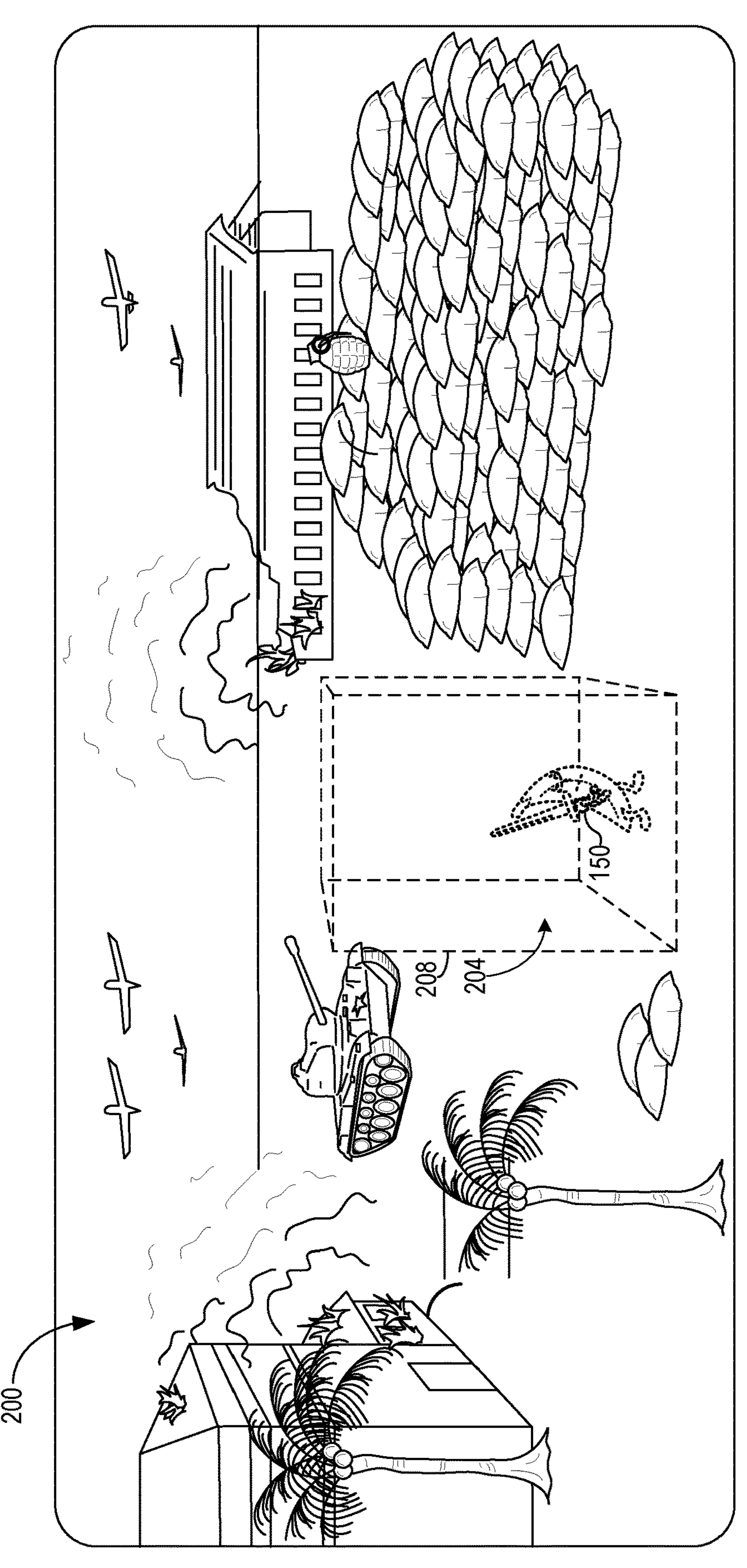
FIG. 3 shows an example of a volumetric space displayed within a virtual reality environment according to examples of the present disclosure.

In the example of FIGS. 2A and 2B, both HMD devices 110 and 122 are mixed reality devices. In other examples, one or more HMD devices may be virtual reality devices that provide a completely immersive experience with no view of the real-world environment. In one example, user Brandi also wants to collaborate with another remote user Senora via Senora's virtual reality HMD device. With reference now to FIG. 3, in one example user Senora is playing a virtual reality shooter game that displays a battlefield 200. Senora's virtual reality HMD device determines that the volumetric space 204 contained within the rectangular volume outlined in dotted lines satisfies the collaboration criterion of an absence of (virtual) objects in a candidate volumetric space. Accordingly, her VR HMD device displays an indication of the volumetric space 204 in the form of outline 208 within the battlefield 200.

Advantageously and in this manner, a volumetric space free from virtual objects and other virtual obstructions is easily and conveniently generated and displayed to Senora. Brandi 104 may now share the evil banana hologram 150 with Senora, and this hologram is displayed by Senora's HMD device within the volumetric space 204.

Figure 4A:
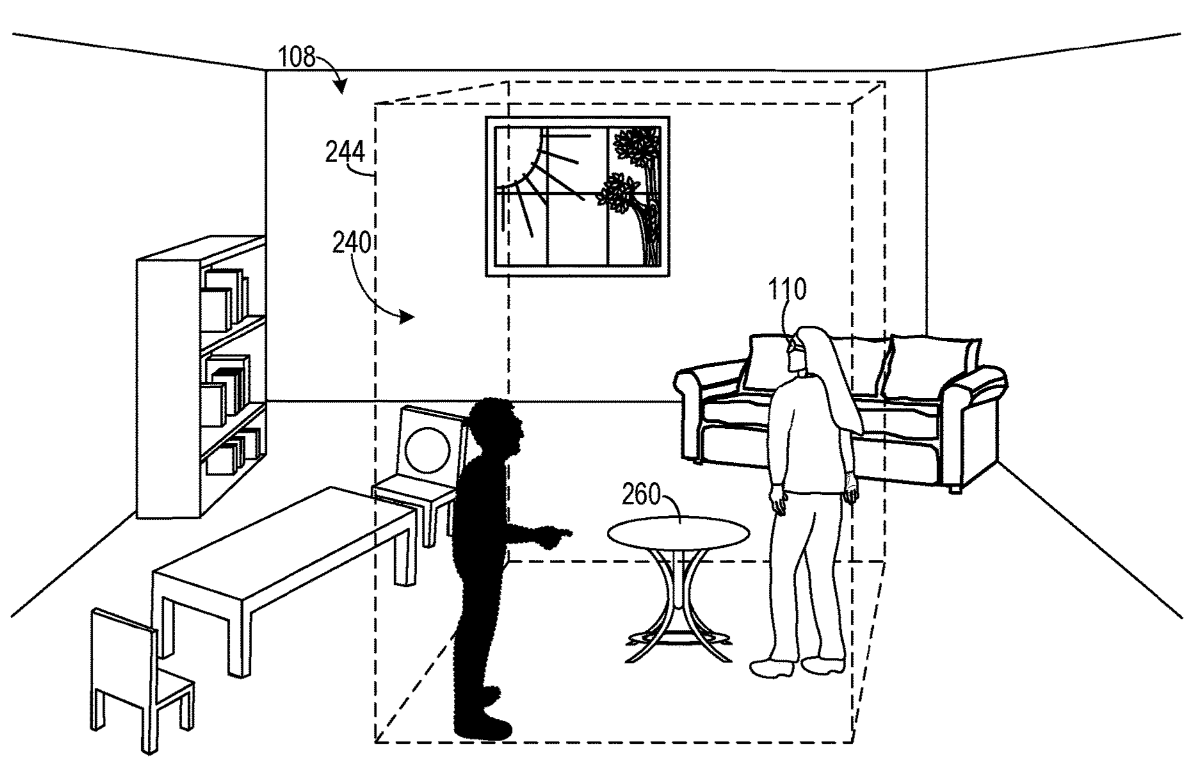
FIGS. 4A and 4B show the use case environments of FIG. 1 according to other examples of the present disclosure.
Figure 4B:
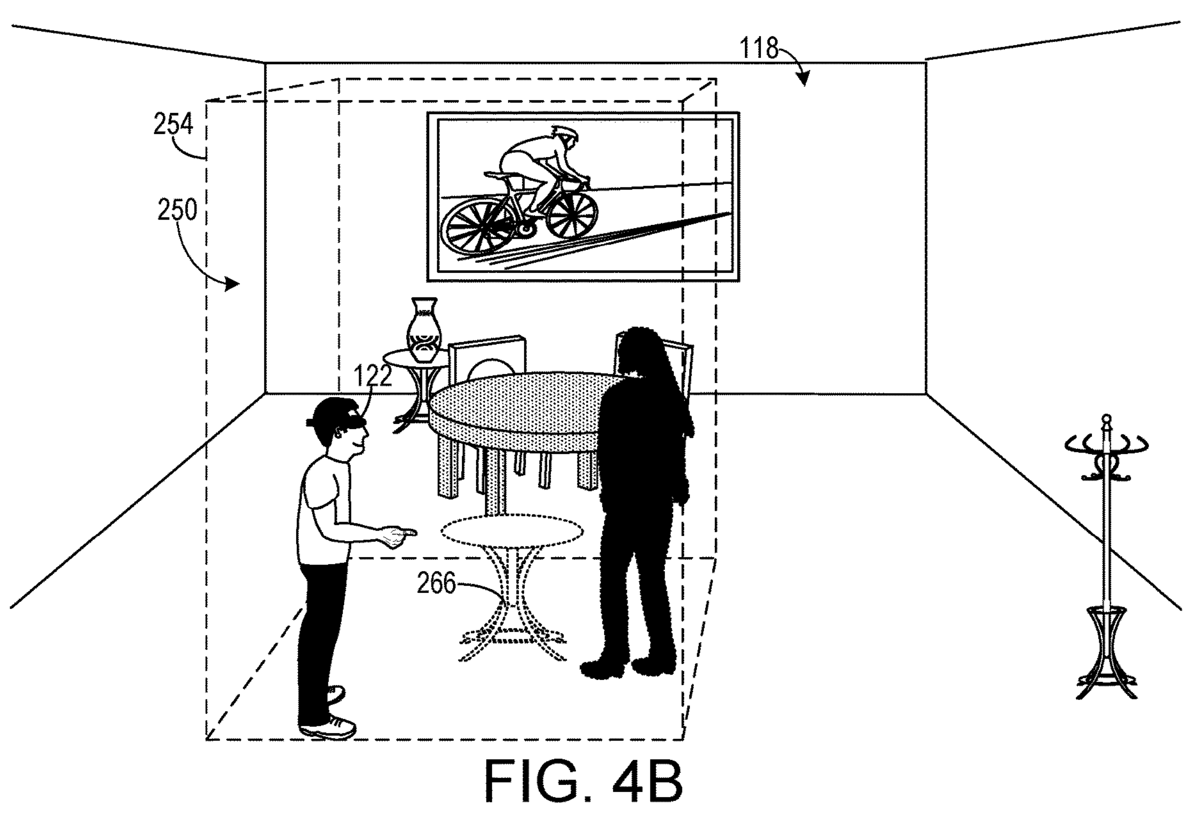

In some examples, other collaboration criteria may be utilized to determine a suitable volumetric space for collaborations. In one example, a collaboration criterion comprises a predetermined geometry and/or volume of volumetric space. With reference to FIGS. 4A and 4B, in one example the collaboration criterion is a rectangular prism having a volume of at least 15 $m^3$, with no restrictions on real-world or virtual objects within the volume (e.g., it is acceptable to have real-world or virtual objects located in the volumetric space). In this example, a first volumetric space 240 in Brandi's living room 108 and a second volumetric space 250 in Tyler's apartment 118 are determined to satisfy this collaboration criteria. Based on these determinations, corresponding indications 244 and 254 are displayed by Brandi's and Tyler's HMD devices, respectively, to visualize the respective volumetric spaces 240 and 250.

As shown in FIG. 4A, a real-world table 260 is located in the first volumetric space 240. In some examples Brandi's HMD device 110 utilizes spatial recognition techniques to identify this real-world object in the first volumetric space 240 as a table. Based on identifying the table 260, Brandi's HMD device 110 causes Tyler's HMD device 122 to display a representation of a table in the second volumetric space 250. In this example, Tyler's HMD device 122 displays a hologram 266 of the table 260.

In some examples, Brandi's HMD device 110 may utilize the spatial mapping of living room 108 and spatial recognition techniques to determine that the object 260 is a table with a circular top surface. This identifying information is sent to Tyler's HMD device 122, which may render a stored holographic image of a table with a circular top surface. Advantageously, using such semantic identification and labeling techniques may reduce the computational expense and network bandwidth requirements for both devices during a collaboration session.

Figure 5:
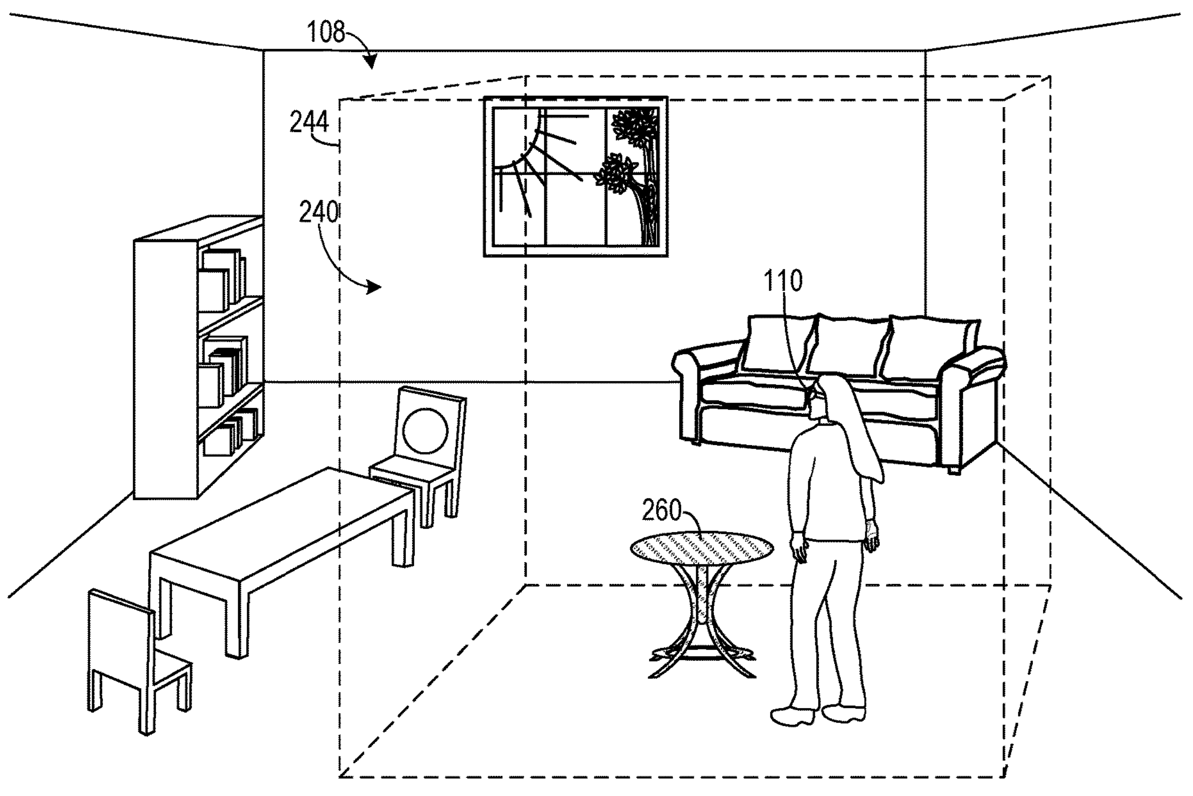
FIG. 5 shows an example of visually augmenting a real-world object according to examples of the present disclosure.

With reference now to FIGS. 4B and 5, in some examples where Brandi's HMD device 110 shares with Tyler's HMD device 122 data corresponding to the real-world table 260 in Brandi's living room, and Tyler's HMD device displays a hologram 266 of the table, Brandi's HMD device 110 visually augments the real-world table to indicate that it is being shared with Tyler's HMD device. In the example of FIG. 5, Brandi's HMD device 110 visually augments the table 260 by displaying candy cane striping on its surfaces to communicate to Brandi that it is being shared with Tyler. In other examples, any other suitable visual augmentation may be utilized to indicate that a real-world object is being shared.

Figure 6A:
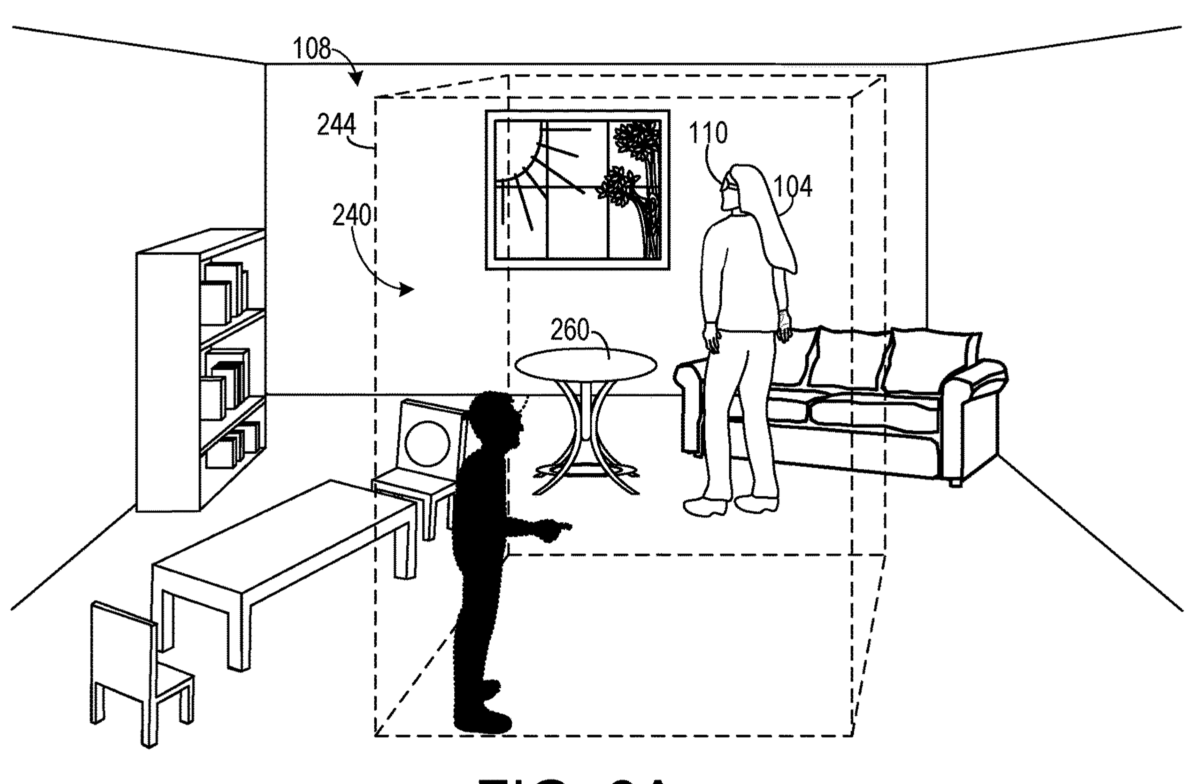
FIGS. 6A and 6B show the use case environments of FIGS. 4A and 4B where the first user and table have moved according to examples of the present disclosure.
Figure 6B:
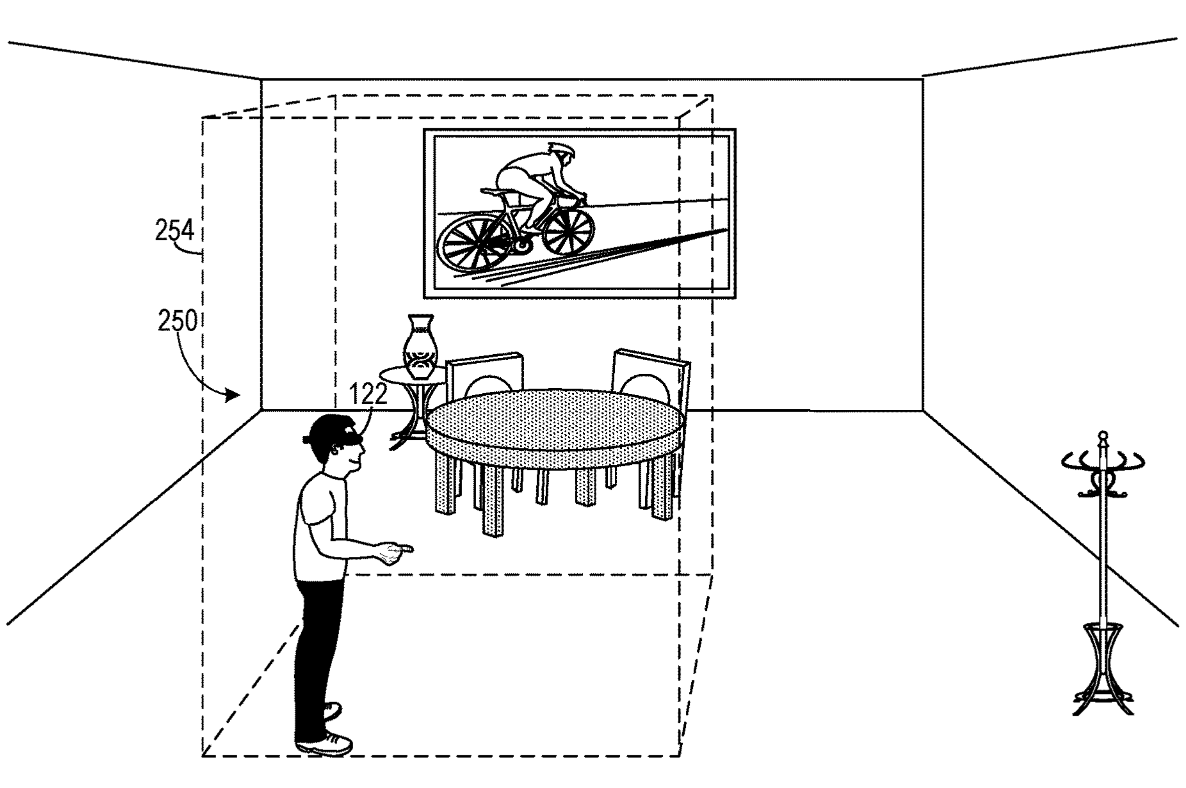

In some examples when a shared real-world object is moved from inside to outside a volumetric space, a representation of the object is no longer displayed by the remote user(s). Accordingly and in one potential advantage of the present disclosure, this provides users with greater control over privacy considerations, and enables users to selectively share and decline to share objects and avatars with others during a collaboration. With reference now to FIGS. 6A and 6B, in one example Brandi 104 moves the table 260 from inside to outside the volumetric space 240. Brandi's HMD device 110 determine that the table 260 leaves the volumetric space 240 and, based on this determination, causes Tyler's HMD device 122 to cease displaying the hologram of the table in the volumetric space 142. In a similar manner, when Brandi 104 moves from inside to outside the volumetric space 240, her avatar is no longer displayed by Tyler's HMD device 122.

As noted above, in some examples other collaboration criteria may be utilized. In one example a collaboration criterion comprises determining that a first object in a first environment and a second object in a second environment share a common semantic label. Based on this determination, a shared hologram is displayed by a second display device at the second object in the second environment.

Figure 7A:
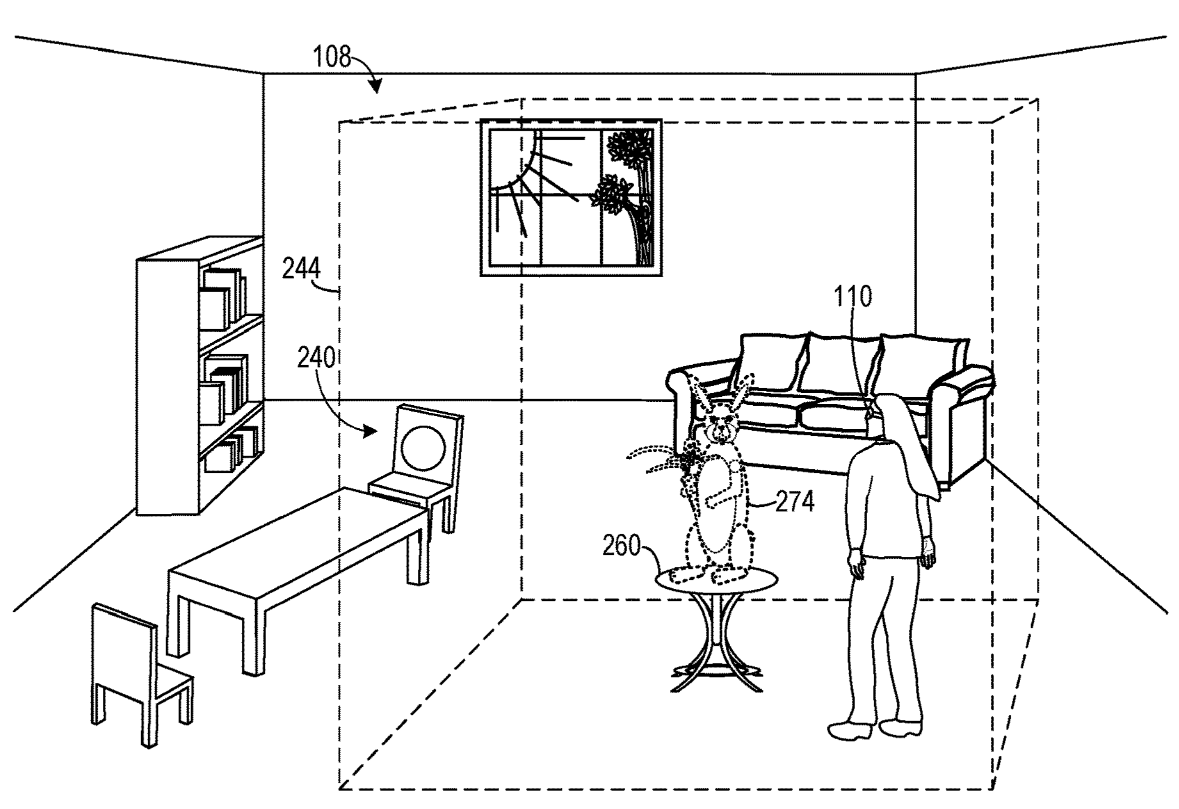
FIGS. 7A and 7B show use case environments in which a shared hologram is displayed on real-world objects according to examples of the present disclosure.
Figure 7B:
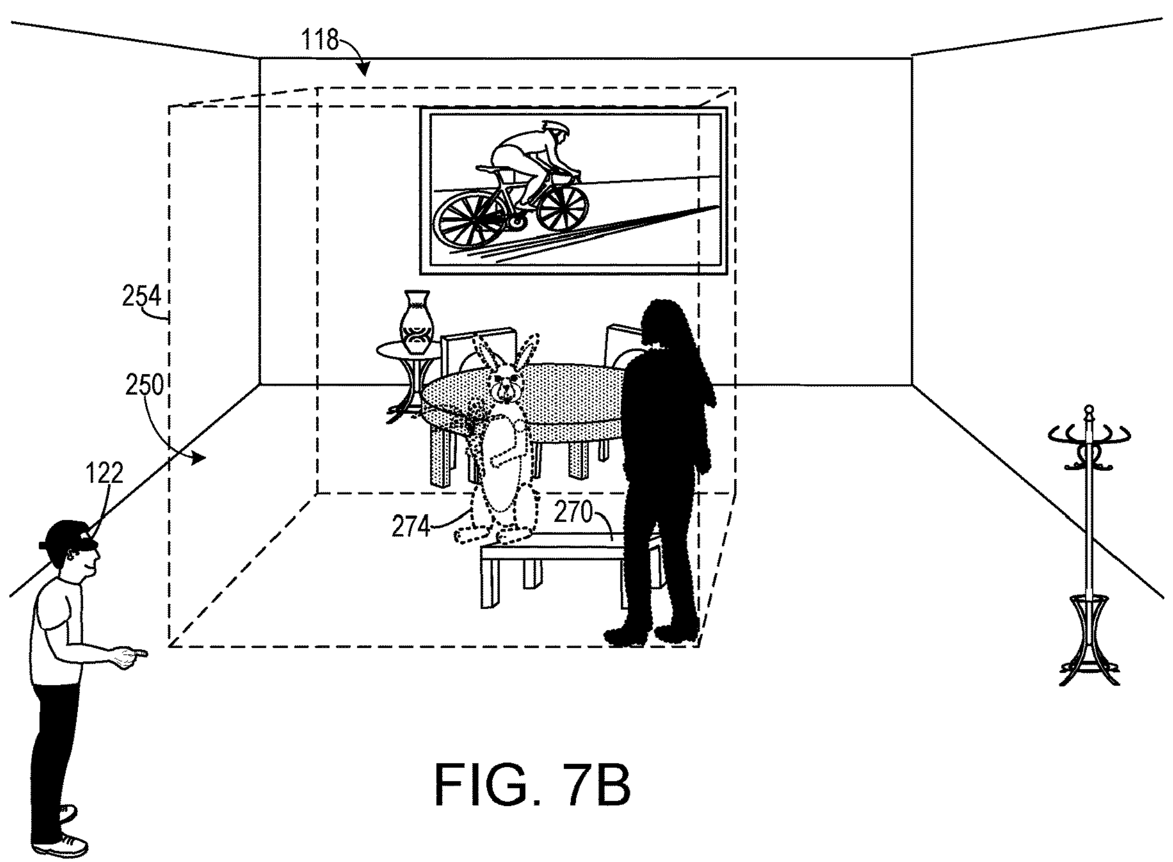

With reference now to FIGS. 7A and 7B, in one example the table 260 is located in Brandi's volumetric space 240 and a different real-world table 270 is located in Tyler's volumetric space 250. In other examples one or both of tables 260 and 270 may be located outside its corresponding volumetric space. As noted above, in some examples Brandi's HMD device 110 may utilize the spatial mapping of living room 108 and spatial recognition techniques to determine that the table 260 is associated with the semantic label "table." In a similar manner, Tyler's HMD device 122 may utilize the spatial mapping of apartment 118 and spatial recognition techniques to determine that the table 270 is also associated with the semantic label "table." Based on determining that the tables 260 and 270 share a common semantic label, Brandi's HMD device 110 displays a shared holographic bunny 274 on the table 260 in her living room, and causes Tyler's HMD device 122 to display the shared holographic bunny 274 on the table 270 in Tyler's apartment. Advantageously and as noted above, using such semantic identification and labeling techniques may reduce the computational expense and network bandwidth requirements for both devices during a collaboration session In other examples, one or both of the objects that share a common semantic label may be virtual objects, such as holograms displayed in a virtual reality environment.

Figure 8A:
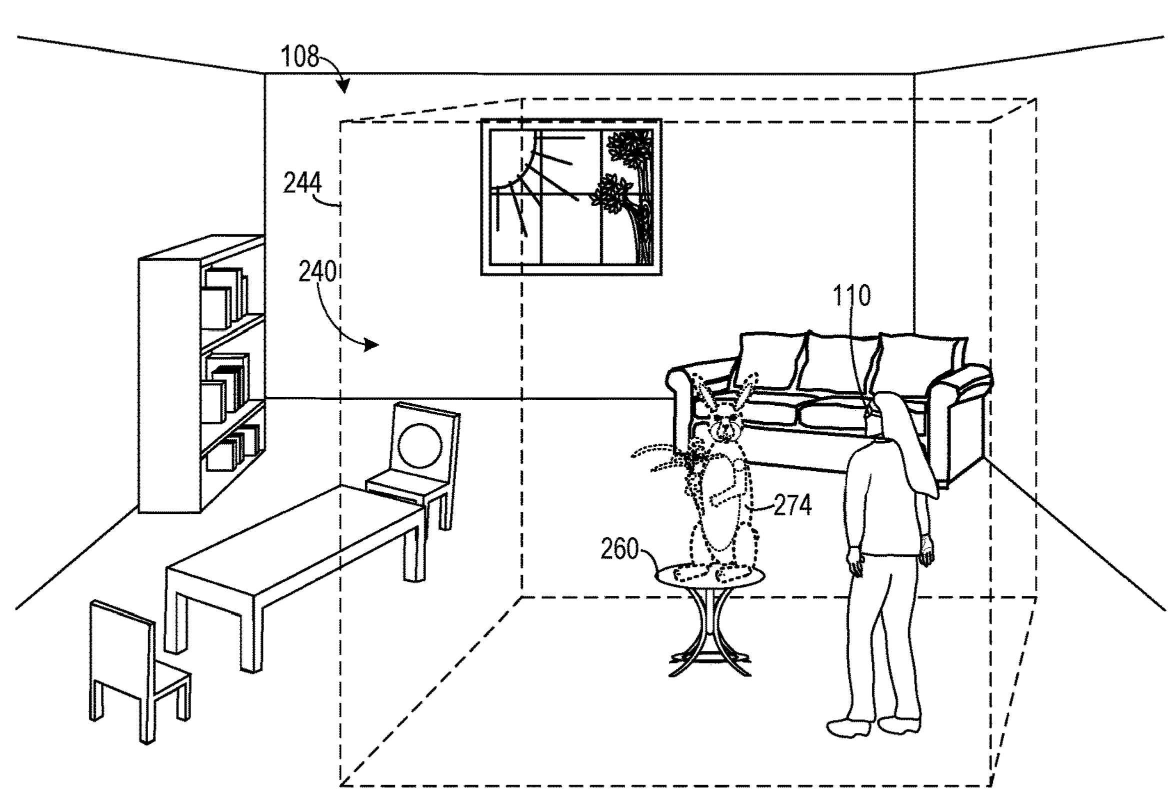
FIGS. 8A and 8B show the use case environments of FIGS. 7A and 7B in which a real-world object is visually augmented according to examples of the present disclosure.
Figure 8B:
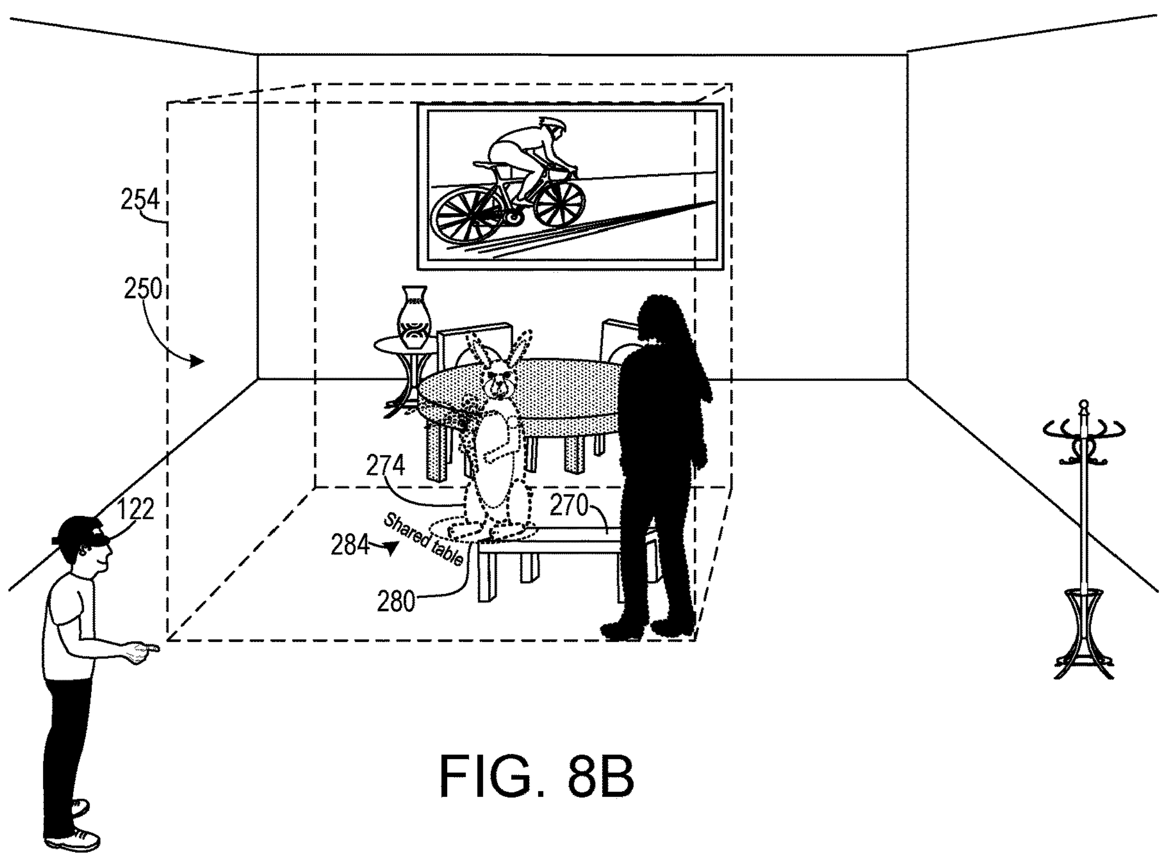

In some examples, such as the example of FIGS. 7A and 7B, the objects sharing a common semantic label may have different shapes and/or geometries. With reference now to FIGS. 8A and 8B, in one example Tyler's HMD device 122 may receive additional data describing the table 260 in Brandi's living room, such as the table having a circular top surface with a diameter of 0.5 m, and data describing the holographic bunny 274 being displayed as standing on the table. Tyler's HMD device 122 may utilize the spatial mapping of his apartment 118 and spatial recognition techniques to determine that the table 270 in his apartment has a rectangular top surface.

Based on this determination, Tyler's HMD device 122 may visually augment the table 270 by displaying a holographic circular tabletop 280 that corresponds to the circular tabletop of Brandi's table 260, and may display the holographic bunny 274 standing on the holographic table top 280 in the same manner as the holographic bunny is displayed on Brandi's table top. In this manner, both Brandi and Tyler may collaboratively view the same holographic bunny 274 standing on similar circular tabletops. In some examples Tyler's HMD device 122 also may display a notification or other indication that the holographic circular tabletop 280 is an item shared from Brandi's environment. In the example of FIG. 8B, Tyler's HMD device 122 displays a notification 284 in the form of the words "Shared table" next to the holographic circular tabletop 280.

Figure 9:
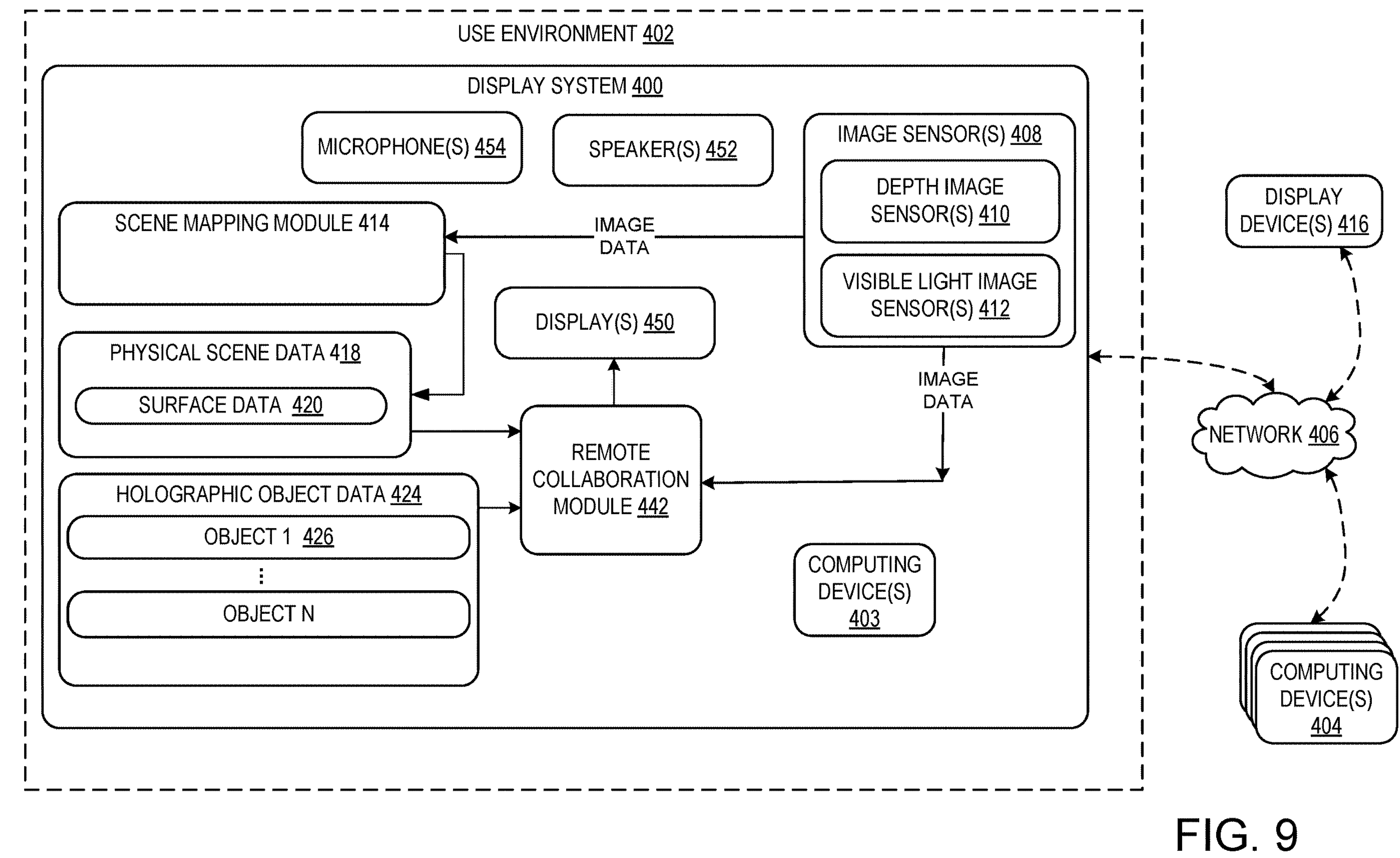
FIG. 9 schematically shows an example display system that may be utilized to facilitate remote collaborations according to examples of the present disclosure.

FIG. 9 is a block diagram illustrating an example use environment 402 comprising a display system 400. In some examples, the display system 400 may comprise an HMD device, such as the augmented reality HMD devices 110 and 122 described herein. In other examples, the display system 400 may comprise a virtual reality display system or a video augmented reality system.

FIG. 9 illustrates example components and modules that may be used to display and manipulate holograms, indications of volumetric spaces and other virtual content in the manners disclosed above, and omits other components for clarity. In some examples, all logic may be executed locally on the display system 400 via one or more computing devices 403. In other examples, some or all logic may be executed remotely, such as by one or more remotely located computing devices 404 that are communicatively coupled to display system 400 via a network 406, or by another local device (e.g. a network edge device, a personal computing device (e.g. a laptop, a tablet, etc.), a mobile computing device, or other suitable computing device). Additionally, display system 400 is communicatively coupled to one or more other display devices 416 via network 406 to facilitate remote collaborations as described herein.

Logic and other aspects of the display system 400 may be distributed across one or more computing devices. For example, a cloud service provider may operate two or more servers, each of which may perform separate aspects of the display system 400. Additional details regarding the components and computing aspects of the display system 400 and computing devices 404 are described in more detail below with reference to FIG. 12 In different examples of display systems according to the present disclosure, one or more components and/or modules of display system 400 may be omitted, and one or more additional components and/or modules may be added.

The display system 400 may comprise one or more image sensors 408 configured to capture image data of a real-world surroundings. The one or more image sensors include a depth image sensor(s) 410 configured to capture depth image data, and optionally may include a visible light image sensor(s) 412 configured to capture visible light image data. Examples of suitable depth sensors for use as depth image sensor 410 include a time of flight camera, a depth camera, and a stereo camera arrangement. Examples of suitable visible light image sensors for use as visible light sensors 412 include an RGB camera and a grayscale camera.

The display system 400 further comprises computing device(s) 403 that include computing hardware, such as memory and logic devices, examples of which are described below in the context of FIG. 12. Various software, firmware, and/or hardware modules may be implemented in such computing hardware. For example, the display system 400 may comprise a scene mapping module 414 configured to receive image data (depth and optionally visible light) from the one or more image sensors 408 and generate a three-dimensional surface reconstruction or other depth map of the use environment 402 based at least on the image data received.

The display system 400 may store the depth map generated by the scene mapping module 414 as physical scene data 418. The physical scene data 418 includes surface data 420. In some examples, the surface data 420 may comprise a surface reconstruction (e.g. a mesh representation of the surface), and further may comprise processed depth data in which portions of mesh data are replaced with planes corresponding to identified surfaces.

In addition to physical scene data 418, the display system 400 may store holographic object data 424 comprising information regarding holographic objects associated with applications that are executable by the display system 400. The depicted holographic object data 424 comprises data for each of one or more holographic objects, indicated as objects 1 through N. Data stored for each object 426 may comprise instructions for displaying the object, and may specify a size, a shape, a color, and/or other characteristics for displaying the object.

The display system 400 may further comprise a remote collaboration module 442 configured to facilitate and enable remote collaborations between users of different display devices as described herein. The remote collaboration module 442 receives physical scene information from the physical scene data 418 and holographic object data 424, such as data regarding the locations of displayed holographic objects compared to the holographic volume and/or real-world surfaces and objects (e.g., floors, walls, ceilings, furniture, people, etc.). The remote collaboration module 442 also may receive image data directly from the image sensor(s) 408.

Using this data and information, the remote collaboration module 442 then outputs, to one or more displays 450, the holographic objects and/or indications of volumetric spaces described herein. The remote collaboration module 442 also may utilize this data and information to selectively occlude or not display certain holographic objects and/or portions of objects as a function of movement and/or relocation of real-world objects and/or other virtual objects.

As noted above, the one or more displays 450 may be see-through with respect to a real-world background or may be opaque. In addition to a display(s) 450, the display system 400 may comprise one or more other output devices and/or input devices. For example, the display system 400 may include one or more speakers 452 configured to output audio, one or more microphones 454, and various other input and output devices not shown in FIG. 9.

Figure 10:
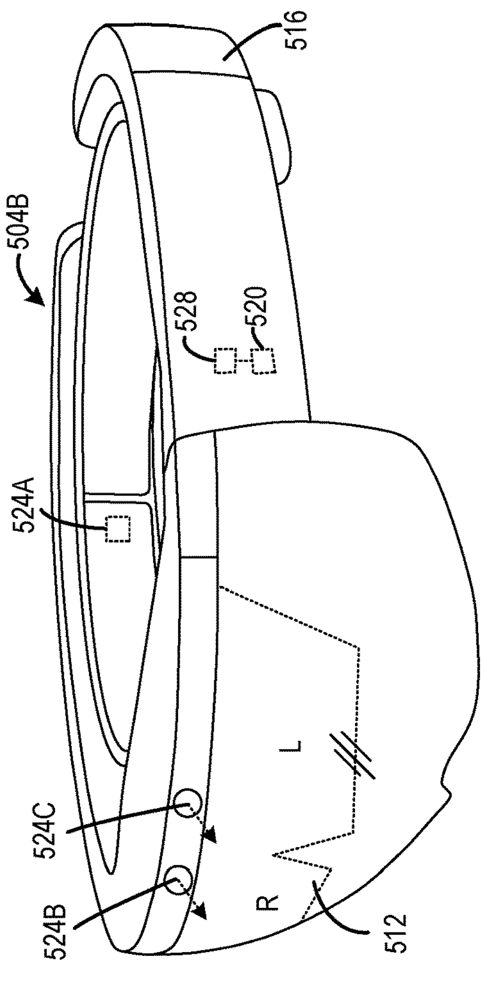
FIG. 10 shows two examples of head-mounted display devices according to examples of the present disclosure.
Figure 10:
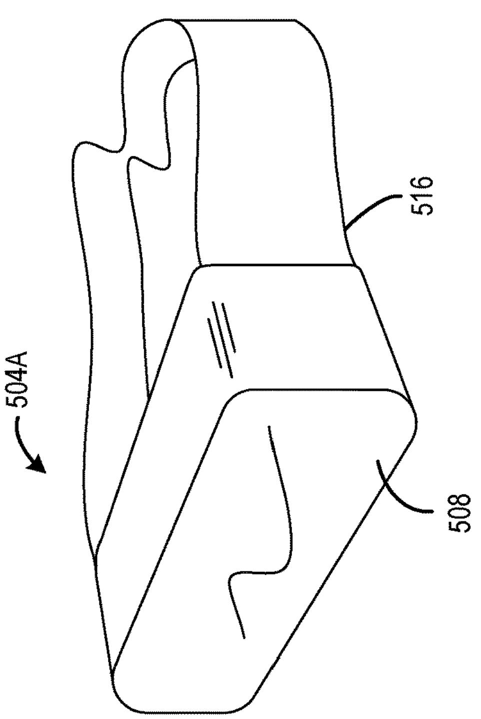

As noted above, aspects of the present disclosure may be practiced by HMD devices that may take a variety of forms. As illustrated in FIG. 10, the HMD device may take the form of a virtual reality HMD device 504A that includes an opaque, non-see-through display 508. Another example of an HMD device is an augmented reality HMD device 504B that comprises an at least partially transparent display 512 that is configured to enable a wearer of the augmented reality HMD device to view physical, real-world objects in the physical environment through one or more partially transparent pixels displaying virtual object representations. It will be appreciated that the following descriptions of sensors and systems may apply to both the augmented reality HMD device 504B and the virtual reality HMD device 504A.

In the example of FIG. 10, each of the example HMD devices 504A and 504B has a construction that includes a frame 516 that wraps around the head of a user to position a display close to the user's eyes. The frame of virtual reality HMD device 504A may include a rigid portion and an elastic portion, whereas the frame 516 of augmented reality HMD device 504B may be substantially rigid around its circumference. The frame 516 may support additional components such as, for example, a processor 520 and input devices 524A, 524B, and 524C. The processor 520 includes logic and associated computer memory 528 configured to provide images to a display, to receive sensory signals from input devices 524A, 524B, and 524C, and to enact various processes and/or other aspects of the techniques and methods described herein.

The processor 520 may include a logic processor and the two example HMD devices 504 may include volatile memory and non-volatile storage, as discussed in more detail below with respect to the example computing system 700 of FIG. 12.

With continued reference to FIG. 10, various suitable display technologies and configurations may be used to display images via the displays of the HMD devices 504A and 504B. For example, in virtual reality (VR) HMD device 504A, the display 508 may be an opaque display, such as a non-see-through Light-Emitting Diode (LED) display, a Liquid Crystal Display (LCD), or any other suitable type of opaque or otherwise non-see-through display. In augmented reality (AR) HMD device 504B, the display 512 may include image-producing elements such as, for example, a see-through Organic Light-Emitting Diode (OLED) display, or a liquid crystal on silicon (LCOS) display. In other examples, the AR HMD device 504B may include a light modulator on an edge of the display 512. In this example, the display 512 may serve as a light guide for delivering light from the light modulator to the eyes of a wearer.

The VR display 508 and AR display 512 may include both a left L and right R display in a stereoscopic display configuration. In AR display 512 the left L and right R displays each display a view of an augmented reality scene from the perspective of the user's corresponding eye. By viewing the augmented reality scene through the left L and right R displays, the user will perceive virtual objects as being located at particular depths in the real world.

The input devices 524A, 524B, and 524C may include various sensors and related systems to provide information to the processor 520. Such sensors may include an inertial measurement unit (IMU) 524A, one or more image sensors 524B, and one or more ambient light sensors 524C. The one or more outward facing image sensors 524B may be configured to capture and/or measure physical environment attributes of the physical environment in which the augmented reality HMD device 504B is located. In one example, the one or more image sensors 524B may include a visible-light camera configured to collect a visible-light image of a physical space.

In both the AR HMD device 504B and VR HMD device 504A, the position and/or orientation of the device relative to the physical environment may be assessed. In different examples, signals from the IMU 524A, the one or more image sensors 524B, and/or the one or more ambient light sensors 524C may be utilized to provide position and/or orientation data to the processor 520. The position and/or orientation derived from the sensor signals may be used to indicate a rotated device orientation of the HMD device.

Figure 11:
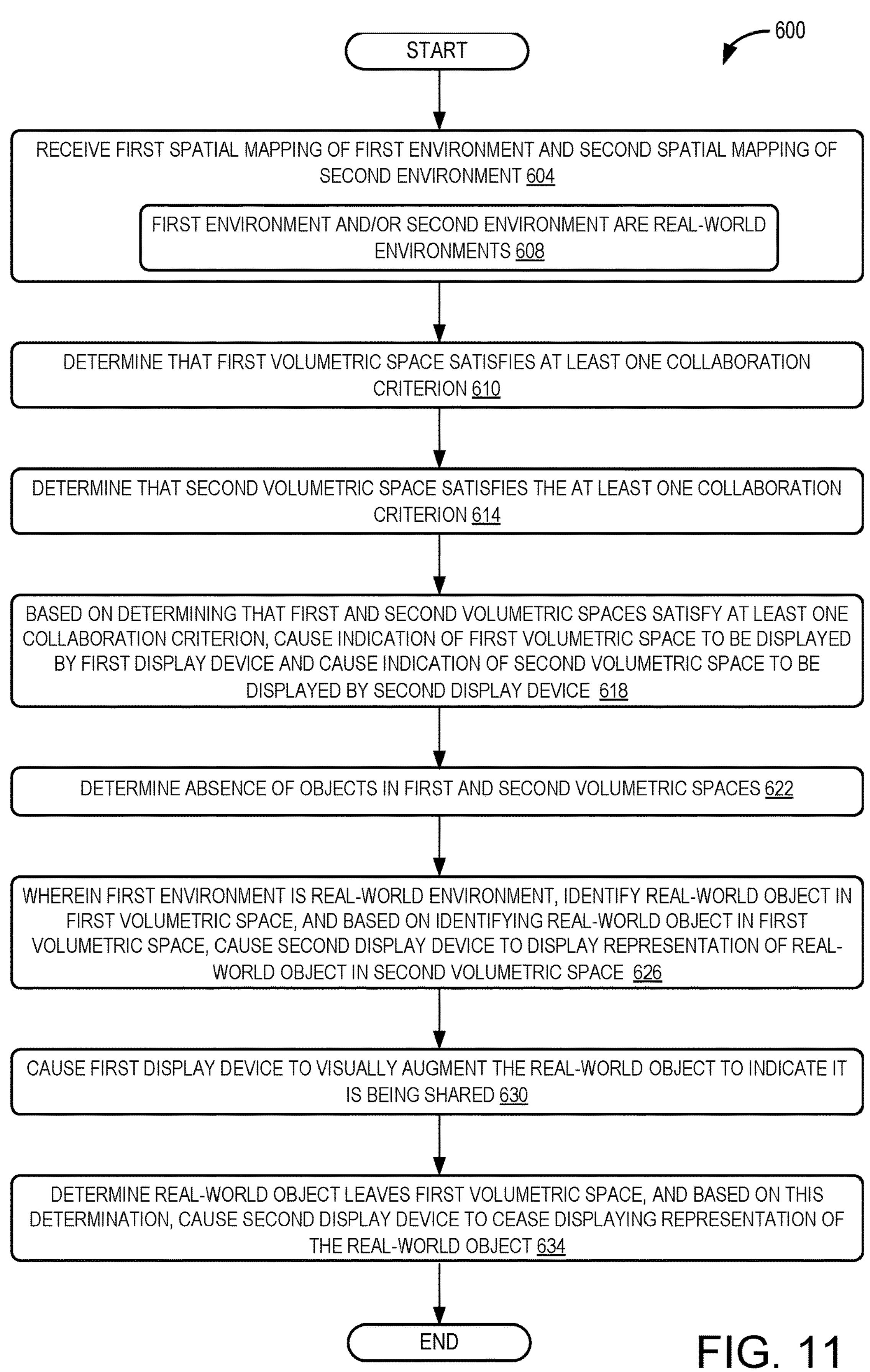
FIG. 11 is a flowchart illustrating an example method for remote collaborations according to examples of the present disclosure.

With reference now to FIG. 11, a flow diagram depicting an example method 600 for remote collaboration between a first display device and a second display device is provided. The following description of method 600 is provided with reference to the components described herein and shown in FIGS. 1-10 and 12, but it will be appreciated that method 600 also may be performed in other contexts using other suitable components.

At 604 the method 600 may include receiving a first spatial mapping of a first environment and a second spatial mapping of a second environment. At 608 the method 600 may include wherein the first environment and/or the second environment are real-world environments. At 610 the method 600 may include determining that a first volumetric space in the first environment satisfies at least one collaboration criterion. At 614 the method 600 may include determining that a second volumetric space in the second environment satisfies the at least one collaboration criterion.

At 618 the method 600 may include, based on determining that the first volumetric space and the second volumetric space each satisfy the at least one collaboration criterion: causing an indication of the first volumetric space to be displayed by the first display device in the first environment; and causing an indication of the second volumetric space to be displayed by the second display device in the second environment. At 622 the method 600 may include wherein determining that the first volumetric space and the second volumetric space each satisfy one or more collaboration criteria comprises determining an absence of objects in the first volumetric space and in the second volumetric space.

At 626 the method 600 may include, wherein at least the first environment is a real-world environment: identifying a real-world object in the first volumetric space; and based on identifying the real-world object in the first volumetric space, causing the second display device to display a representation of the real-world object in the second volumetric space. At 630 the method 600 may include causing the first display device to visually augment the real-world object in the first volumetric space to indicate it is being shared with the second display device. At 634 the method 600 may include determining that the real-world object leaves the first volumetric space; and based on determining that the real-world object leaves the first volumetric space, causing the second display device to cease displaying the representation of the real-world object in the second volumetric space.

It will be appreciated that method 600 is provided by way of example and is not meant to be limiting. Therefore, it is to be understood that method 600 may include additional and/or alternative steps relative to those illustrated in FIG.

11. Further, it is to be understood that method 600 may be performed in any suitable order. Further still, it is to be understood that one or more steps may be omitted from method 600 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
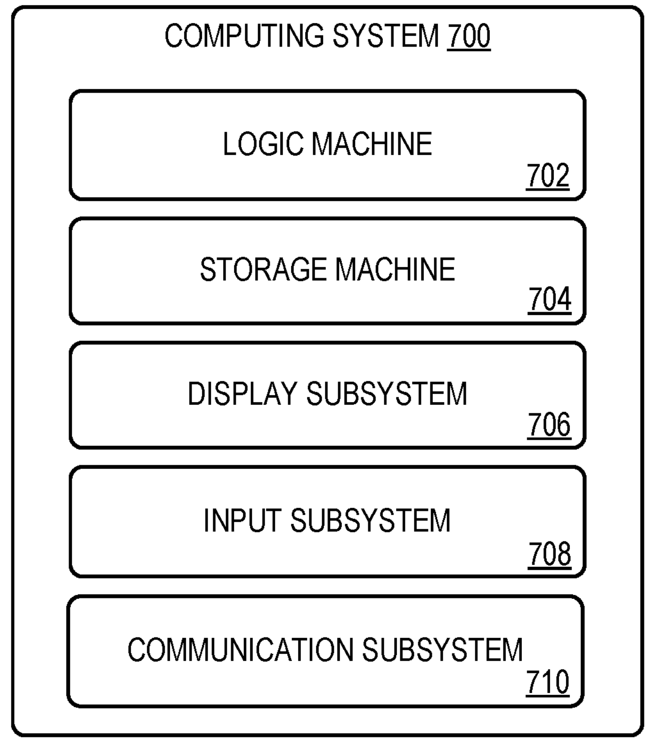
FIG. 12 is a block diagram illustrating an example computing system.

FIG. 12 schematically shows an example computing system 700 that can enact one or more of the methods and processes described above. Computing system 700 is shown in simplified form. Computing system 700 may take the form of or be embedded within one or more HMD devices (e.g. HMD devices 110 and 122), personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 12.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The following paragraphs provide additional support for the claims of the subject application. One aspect provides computing device for facilitating remote collaborations, the computing device comprising: a logic subsystem comprising a processor; and memory storing instructions executable by the logic subsystem to: receive a spatial mapping of a first three-dimensional environment; determine that a volumetric space in the spatial mapping of the first three-dimensional environment satisfies at least one collaboration criterion that facilitates collaborative interaction with virtual content, wherein the collaboration criterion comprises determining that a first object in the first three-dimensional environment and a second object in a second three-dimensional environment share a common semantic label; and based on determining that the volumetric space satisfies the at least one collaboration criterion, cause a shared hologram to be displayed by a first display device at the first object in the first environment, and cause the shared hologram to be displayed by a second display device at the second object in the second three-dimensional environment. The computing device may additionally or alternatively include, wherein the first three-dimensional environment is a real-world environment. The computing device may additionally or alternatively include, wherein the first object is a real-world object. The computing device may additionally or alternatively include, wherein the first object is a virtual object. The computing device may additionally or alternatively include, wherein the first three-dimensional environment is a virtual environment. The computing device may additionally or alternatively include, wherein the instructions are executable to: determine that the first object has a first shape and the second object has a second shape different from the first shape; and based on determining that the first object has the first shape and the second object has the second shape different from the first shape, visually augment the first object by displaying a holographic object having the second shape. The computing device may additionally or alternatively include, wherein the instructions are executable to display an indication that the holographic object is shared from the second three-dimensional environment. The computing device may additionally or alternatively include, wherein determining that the volumetric space satisfies the at least one collaboration criterion comprises determining an absence of objects in the volumetric space. The computing device may additionally or alternatively include, wherein the volumetric space is a first volumetric space, and wherein the instructions are executable to: create a common origin in the first volumetric space and in a second volumetric space in a spatial mapping of the second three-dimensional environment; cause a shared hologram to be displayed by the first display device in the first volumetric space at a designated location relative to the common origin; and cause the shared hologram to be displayed by the second display device in the second volumetric space at the designated location relative to the common origin. The computing device may additionally or alternatively include, wherein the volumetric space is a first volumetric space, the first three-dimensional environment is a real-world environment, and wherein the instructions are executable to: identify a real-world object in the first volumetric space; based on identifying the real-world object in the first volumetric space, cause a second display device to display a representation of the real-world object in a second volumetric space of the second three-dimensional environment; and cause the first display device to visually augment the real-world object in the first volumetric space to indicate it is being shared with the second display device. The computing device may additionally or alternatively include, wherein the volumetric space is a first volumetric space, the first three-dimensional environment is a real-world environment, and wherein the instructions are executable to: identify a real-world object in the first volumetric space; based on identifying the real-world object in the first volumetric space, cause a second display device to display a representation of the real-world object in a second volumetric space of the second three-dimensional environment; determine that the real-world object leaves the first volumetric space; and based on determining that the real-world object leaves the first volumetric space, cause the second display device to cease displaying the representation of the real-world object in the second volumetric space.

Another aspect provides a method for facilitating remote collaboration between a first display device and a second display device, the method comprising: receiving a spatial mapping of a first three-dimensional environment; determining that a volumetric space in the spatial mapping of the first three-dimensional environment satisfies at least one collaboration criterion that facilitates collaborative interaction with virtual content, wherein the collaboration criterion comprises determining that a first object in the first three-dimensional environment and a second object in a second three-dimensional environment share a common semantic label; and based on determining that the volumetric space satisfies the at least one collaboration criterion, causing a shared hologram to be displayed by the first display device at the first object in the first environment, and causing the shared hologram to be displayed by the second display device at the second object in the second three-dimensional environment. The method may additionally or alternatively include, wherein the first three-dimensional environment is a real-world environment. The method may additionally or alternatively include, wherein the first object is a real-world object. The method may additionally or alternatively include, wherein the first object is a virtual object. The method may additionally or alternatively include, wherein the first three-dimensional environment is a virtual environment. The method may additionally or alternatively include, determining that the first object has a first shape and the second object has a second shape different from the first shape; and based on determining that the first object has the first shape and the second object has the second shape different from the first shape, visually augmenting the first object by displaying a holographic object having the second shape. The method may additionally or alternatively include, displaying an indication that the holographic object is shared from the second three-dimensional environment. The method may additionally or alternatively include, wherein the volumetric space is a first volumetric space, the method further comprising: creating a common origin in the first volumetric space and in a second volumetric space in a spatial mapping of the second three-dimensional environment; causing a shared hologram to be displayed by the first display device in the first volumetric space at a designated location relative to the common origin; and causing the shared hologram to be displayed by the second display device in the second volumetric space at the designated location relative to the common origin.

Another aspect provides a head-mounted display device, comprising: a see-through display system; a logic subsystem comprising a processor; and memory storing instructions executable by the logic subsystem to: receive a spatial mapping of a first three-dimensional environment; determine that a volumetric space in the spatial mapping of the first three-dimensional environment satisfies at least one collaboration criterion that facilitates collaborative interaction with virtual content, wherein the collaboration criterion comprises determining that a first real-world object in the first three-dimensional environment and a second real-world object in a second three-dimensional environment share a common semantic label; and based on determining that the volumetric space satisfies the at least one collaboration criterion, cause a shared hologram to be displayed by the see-through display system at the first real-world object in the first environment, and cause the shared hologram to be displayed by a second display device at the second real-world object in the second three-dimensional environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for facilitating remote collaborations, the computing device comprising:

a logic subsystem comprising a processor; and memory storing instructions executable by the logic subsystem to:

receive a spatial mapping of a first three-dimensional environment;

determine that a volumetric space in the spatial mapping of the first three-dimensional environment satisfies at least one collaboration criterion that facilitates collaborative interaction with virtual content, wherein the collaboration criterion comprises determining that a first object in the first three-dimensional environment and a second object in a second three-dimensional environment share a common semantic label; and based on determining that the volumetric space satisfies the at least one collaboration criterion, cause a shared hologram to be displayed by a first display device at the first object in the first environment, and cause the shared hologram to be displayed by a second display device at the second object in the second three-dimensional environment.

2. The computing device of claim 1, wherein the first three-dimensional environment is a real-world environment.

3. The computing device of claim 2, wherein the first object is a real-world object.

4. The computing device of claim 2, wherein the first object is a virtual object.

5. The computing device of claim 1, wherein the first three-dimensional environment is a virtual environment.

6. The computing device of claim 1, wherein the instructions are executable to:

determine that the first object has a first shape and the second object has a second shape different from the first shape; and based on determining that the first object has the first shape and the second object has the second shape different from the first shape, visually augment the first object by displaying a holographic object having the second shape.

7. The computing device of claim 6, wherein the instructions are executable to display an indication that the holographic object is shared from the second three-dimensional environment.

8. The computing device of claim 1, wherein determining that the volumetric space satisfies the at least one collaboration criterion comprises determining an absence of objects in the volumetric space.

9. The computing device of claim 1, wherein the volumetric space is a first volumetric space, and wherein the instructions are executable to:

create a common origin in the first volumetric space and in a second volumetric space in a spatial mapping of the second three-dimensional environment;

cause a shared hologram to be displayed by the first display device in the first volumetric space at a designated location relative to the common origin; and cause the shared hologram to be displayed by the second display device in the second volumetric space at the designated location relative to the common origin.

10. The computing device of claim 1, wherein the volumetric space is a first volumetric space, the first three-dimensional environment is a real-world environment, and wherein the instructions are executable to:

identify a real-world object in the first volumetric space;

based on identifying the real-world object in the first volumetric space, cause a second display device to display a representation of the real-world object in a second volumetric space of the second three-dimensional environment; and cause the first display device to visually augment the real-world object in the first volumetric space to indicate it is being shared with the second display device.

11. The computing device of claim 1, wherein the volumetric space is a first volumetric space, the first three-dimensional environment is a real-world environment, and wherein the instructions are executable to:

identify a real-world object in the first volumetric space;

based on identifying the real-world object in the first volumetric space, cause a second display device to display a representation of the real-world object in a second volumetric space of the second three-dimensional environment;

determine that the real-world object leaves the first volumetric space; and based on determining that the real-world object leaves the first volumetric space, cause the second display device to cease displaying the representation of the real-world object in the second volumetric space.

12. A method for facilitating remote collaboration between a first display device and a second display device, the method comprising:

receiving a spatial mapping of a first three-dimensional environment;

determining that a volumetric space in the spatial mapping of the first three-dimensional environment satisfies at least one collaboration criterion that facilitates collaborative interaction with virtual content, wherein the collaboration criterion comprises determining that a first object in the first three-dimensional environment and a second object in a second three-dimensional environment share a common semantic label; and based on determining that the volumetric space satisfies the at least one collaboration criterion, causing a shared hologram to be displayed by the first display device at the first object in the first environment, and causing the shared hologram to be displayed by the second display device at the second object in the second three-dimensional environment.

13. The method of claim 12, wherein the first three-dimensional environment is a real-world environment.

14. The method of claim 13, wherein the first object is a real-world object.

15. The method of claim 13, wherein the first object is a virtual object.

16. The method of claim 12, wherein the first three-dimensional environment is a virtual environment.

17. The method of claim 12, further comprising:

determining that the first object has a first shape and the second object has a second shape different from the first shape; and based on determining that the first object has the first shape and the second object has the second shape different from the first shape, visually augmenting the first object by displaying a holographic object having the second shape.

18. The method of claim 17, further comprising displaying an indication that the holographic object is shared from the second three-dimensional environment.

19. The method of claim 12, wherein the volumetric space is a first volumetric space, the method further comprising:

creating a common origin in the first volumetric space and in a second volumetric space in a spatial mapping of the second three-dimensional environment;

causing a shared hologram to be displayed by the first display device in the first volumetric space at a designated location relative to the common origin; and causing the shared hologram to be displayed by the second display device in the second volumetric space at the designated location relative to the common origin.

20. A head-mounted display device, comprising:

a see-through display system;

a logic subsystem comprising a processor; and memory storing instructions executable by the logic subsystem to:

receive a spatial mapping of a first three-dimensional environment;

determine that a volumetric space in the spatial mapping of the first three-dimensional environment satisfies at least one collaboration criterion that facilitates collaborative interaction with virtual content, wherein the collaboration criterion comprises determining that a first real-world object in the first three-dimensional environment and a second real-world object in a second three-dimensional environment share a common semantic label; and based on determining that the volumetric space satisfies the at least one collaboration criterion, cause a shared hologram to be displayed by the see-through display system at the first real-world object in the first environment, and cause the shared hologram to be displayed by a second display device at the second real-world object in the second three-dimensional environment.

* * * * *